Feb. 17, 1959 C. C. LARSON 2,874,101
METHOD OF MAKING DOUBLE-SIDED MOSAIC
Filed Sept. 17, 1952
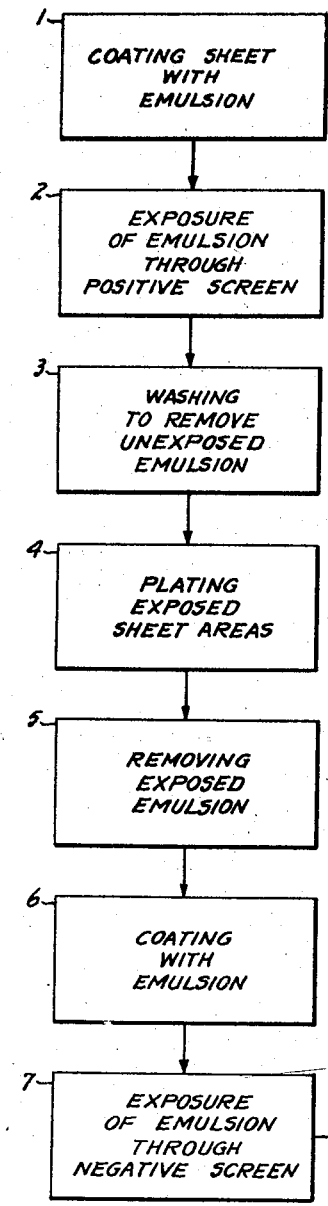
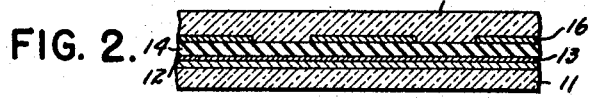
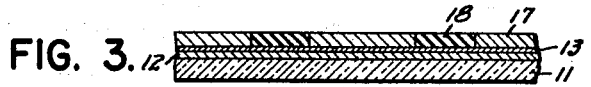
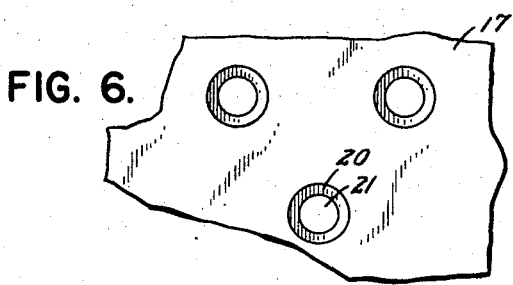
INVENTOR.
C. C. LARSON
BY
ATTORNEY

United States Patent Office 2,874,101
Patented Feb. 17, 1959

2,874,101

METHOD OF MAKING DOUBLE-SIDED MOSAIC

Christian Charles Larson, Fort Wayne, Ind., assignor to Farnsworth Research Corporation, Fort Wayne, Ind., a corporation of Delaware Application September 17, 1952, Serial No. 310,011

3 Claims. (Cl. 204—11)

This invention relates to processes of fabricating metallic screens and to screens so fabricated.

In mosaic screens used for storage of electrical energy particularly by scansion of electron beams and the like it is general practice to provide a mosaic screen of insulated particles for electro-static storage of charges. It is frequently desirable that such mosaic screens be capable of receiving or dissipating charges from both sides. This requires that the insulated storage particles extend through the screen surface so that effects of voltage charges will be transferred readily between the opposite faces.

To construct such double sided mosaic screens is a rather difficult and relatively expensive procedure. These difficulties are greatly increased as the size of the insulated particles or elements is decreased and the number increased to provide a screen capable of high picture definitions.

Photo-engraving techniques have been used to produce fine mesh screens or perforate plates which may serve as base elements for mosaic screens.

It is an object of this invention to provide a novel process for fabricating or making double sided mosaic screens which preferably utilizes photo-engraving techniques, and the double sided screens so fabricated.

According to a feature of my invention a double sided metallic screen is fabricated by providing a metal screen having apertures therein on a base support member, which may comprise a glass plate coated with a given metal, preferably by a photo-engraving process and electroplating; forming an insulating ring within each aperture of said screen, preferably by a photo-engraving process using a mask covering the center portion of the apertures; depositing metal in the openings in the metal rings, preferably by electro-plating; and removing the supporting plate from the resulting mosaic, preferably by subjecting the entire assembly to the action of a caustic bath which attacks and effectively dissolves the base support metal leaving the deposited mosaic intact.

It will be recognized that by this process a uniform mosaic may be formed without laborious mechanical fabrication. By dissolving the base support delicate mosaic screens can be removed after plating without danger of damage to the screen.

The above-mentioned and other features and objects of this invention and the manner of attaining them will become more apparent and the invention itself will be best understood by reference to the following description of an embodiment of the invention taken in conjunction with the accompanying drawings, in which Fig. 1 is a diagrammatic flow chart illustrating the process steps;

Figs. 2, 3, 4 and 5 are fragmentary sectional views of mosaic plate formation during certain of the process steps; and Fig. 6 is a fragmentary diagram of a portion of a mosaic screen made according to the illustrated process.

Turning now to the drawing, Fig. 1 represents the flow sheet of the various steps of the process in accordance with this invention. A base plate is first coated at 1 with a photo-engraving emulsion. This base plate is made of a metal which may be dissolved or otherwise disposed of in a particular solution. For example, the plate may be made of aluminum which will effectively dissolve in a solution of potassium hydroxide. Preferably the plate is not simply a stiff aluminum plate but is made up as follows:

A glass plate is coated with aluminum on one surface by evaporation. On top of this aluminum coating may be deposited a thin coat of zinc. The plate may then be coated with the emulsion by dipping it two or three times in the emulsion until a fairly thick coating of the emulsion is obtained. The emulsion is then dried, preferably at room temperature, in a dark place, or at least in a place shielded from direct light.

This coated plate is then covered with a template duplicating the fine mesh screen pattern desired. For example, if a metal screen with round or square-shaped holes, arranged in a checker-board fashion, is to be produced, the template might consist of a metal screen of this form (well known in the art) or of a glass photographic plate carrying this pattern; it is transmissive to light where the holes are and opaque everywhere else. This plate is placed in direct contact with the emulsion and is exposed to light from a source directly above the plates as indicated at stage 2 in Fig. 1. It is desirable that the glass photographic plate be held firmly against the emulsion so that there will be no defraction of light at the edges which would cause fuzziness in the printed pattern.

The photographic plate is then removed and the exposed emulsion is developed and washed at stage 3 to remove the unexposed emulsion. Photo-engraving emulsion has the property that it can be washed away where it is unexposed, while it stays put where light has hit it. Hence, the emulsion will stay put where the screen holes will be.

At stage 4 a plating of screen metal is made preferably by the use of an electro-plating bath so that the uncovered portions of the metal backing plate are provided with a plating of this metal. Preferably copper is used as the screen metal. In making the electrolytic plating care should be taken to ensure that a fine deposit of copper is obtained. At the end of this stage, the backing plate will be covered with a copper-layer having a regular array of holes.

At stage 5 exposed portions of the emulsion are removed from the screen and the sheet is again coated with emulsion at stage 6, particularly to fill in all of the holes in the plated copper.

At stage 7 a second photographic plate is provided having principally transparent areas and having opaque areas which are smaller than the holes left in the plated copper. This plate is put in contact with the emulsion, with the opaque areas registered preferably at the center of the openings in the metal deposited screen. The emulsion is then again exposed to light through this photographic screen.

One way to provide the photographic plate is to start from the template mentioned in connection with stage 2 above, build it up electrolytically so as to reduce the hole diameter, and making a photographic negative of it.

The plate is then processed in stage 8 to develop the emulsion and remove the unexposed portion which will then uncover the portion of the base plate substantially centrally of the openings in the first plated areas. Preferably this plate is then heated as by a torch further to harden the exposed emulsion. The plate is then again immersed into a plating bath at stage 9 so as to deposit more of the metal in these openings centrally of the emulsion. For this copper plating process as well as for the first copper plating it is preferable to use a copper cyanide bath. The plating is continued until the plugs deposited in the openings of the emulsion are built up to substantially the same thickness as the original screen deposit.

The screen is then carefully washed in water to remove all of the copper plating bath material and then at stage 10 the plate is immersed in a solution such as potassium hydroxide which will dissolve the aluminum backing permitting the screen to slip from the glass plate. It will be clear that if desired the entire backing plate can be made of aluminum so that upon dissolution the mosaic screen would be free of any support. However, in order to secure the required stiffness a rather heavy aluminum backing would be required and so it is therefore preferred to use a system in which a glass plate or the like is used for support.

Turning now to Figs. 2, 3, 4, and 5 there is illustrated fragmentary plate portions in cross-section showing some of the steps of the process. In these figures the glass backing plate is shown at 11 on which is deposited the aluminum coating 12 covered with the zinc plating 13. This composite backing plate is the same in all of these four figures. The first emulsion layer is shown in Fig. 2 at 14 and the first photographic plate 15 with the opaque pattern 16 is shown in place ready for exposure.

Figure 3 illustrates this same backing plate with the copper screen deposit shown at 17 and the fresh coating of unexposed emulsion indicated at 18. It will be understood that in some cases emulsion coating may also overlie the top of the copper screen portion 17. This may be helpful in some cases as it will reduce the tendency for further deposit of copper on this portion but may necessitate the removal of such emulsion after the second exposure if it is important to have this area surface conductive.

In Fig. 4 the plate as shown in Fig. 3 is shown with the second photographic plate 19 carrying opaque areas 20 in contact with the emulsion surface for the purpose of making the second exposure. Fig. 5 shows the plated screen before removal of the backing plate. In addition to the screen deposit 17 there is present the hardened exposed emulsion 20 together with the deposited center blocks or plugs 21.

After removal of the backing plate the mosaic screen may be somewhat in the form illustrated in the fragmentary view of Fig. 6. Here the principal screen element deposit is shown with the hardened emulsion rings 20 and the deposited copper plugs 21.

All these illustrations are made simply to show the nature of the screen and are not intended to illustrate the dimensions nor exact preparation of the various elements of the plated screen. It will be clearly apparent that each of the plugs 21 is insulated one from the other and extends through the composite screen so as to be exposed at both surfaces. The hardened emulsion 20 serves as a support for these plugs and at the same time as an insulator to isolate them from the principal screen portion 17 and from each other. This completed mosaic plate may then be treated in any desired manner to secure the effects desired. For example, one surface may be treated with photo-emissive material and the other with a secondary electron emissive material, or any other type of use may be made of the screen.

While I have described a photo-engraving and plating process for making the entire screen in accordance with this invention, it is clear that other similar processes may be used within the spirit and scope of my invention. Furthermore, the depositing of the main body portion of the screen may be effected in some other manner if desired. For example, the screening may be preformed and secured properly to a desired backing plate after which mosaic elements themselves may be formed and deposited by the photo-engraving process as described above. Also, after a mosaic has been made by the method here proposed it may be possible to make a photographic positive of it and use it as template, thus combining stages 2 and 7 of the procedure outlined above, making stages 3 to 6 unnecessary. Moreover, the copper plating in each instance may be effected by other means, such as spraying.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. The process of making a double sided storage mosaic screen, which comprises coating a metallic sheet with photo-engraving emulsion, exposing the emulsion through a screen provided with openings of given dimensions, removing the unexposed emulsion to uncover said metallic sheet, plating on uncovered portions of said sheet a metal different from said sheet metal, removing exposed emulsion from said sheet to provide holes through said plated metal, filling said holes with unexposed photo-engraving emulsion, exposing said emulsion through a transparent mask having opaque portions registering with said filled holes but of smaller dimensions than said holes, whereby an exposed ring of said emulsion is formed, removing the unexposed emulsion from said surface, plating the uncovered portions of said sheet within said rings with said different metal, to provide a composite screen of said different metal and exposed emulsion, and removing said metallic sheet from said component screen.

2. A process according to claim 1, wherein said plating is accomplished by electro-plating.

3. The process of making a double sided storage mosaic screen, which comprises coating an aluminum sheet with photo-engraving emulsion, exposing the emulsion through a screen provided with openings of given dimensions, removing the unexposed emulsion to uncover said metallic sheet, plating copper on uncovered portions of said sheet, removing exposed emulsion from said sheet to provide holes through said plated metal, filling said holes with unexposed photo-engraving emulsion, exposing said emulsion through a transparent mask having opaque portions registering with said filled holes but of smaller dimensions than said holes, whereby an exposed ring of said emulsion is formed, removing the unexposed emulsion from said surface, plating the uncovered portions of said sheet within said rings with copper, to provide a composite screen of copper and exposed emulsion, and dissolving said aluminum sheet in a potassium hydroxide solution.

References Cited in the file of this patent

UNITED STATES PATENTS

| Number | Name | Date |
| --- | --- | --- |
| 536,259 | Bloede | Mar. 26, 1895 |
| 577,070 | Sandham | Feb. 16, 1897 |
| 704,401 | Taluau | July 8, 1902 |
| 2,024,086 | Ballard | Dec. 10, 1935 |
| 2,146,994 | Schroter et al. | Feb. 14, 1939 |
| 2,175,689 | Gallup | Oct. 10, 1939 |
| 2,179,090 | Holman | Nov. 7, 1939 |
| 2,189,340 | Donal | Feb. 6, 1940 |
| 2,198,327 | Bandringa et al. | Apr. 23, 1940 |
| 2,246,380 | Norris | June 17, 1941 |
| 2,262,123 | Sukumlyn | Nov. 11, 1941 |
| 2,369,569 | Hulbert | Feb. 13, 1945 |
| 2,419,028 | Norris | Apr. 15, 1947 |
| 2,459,129 | Gresham et al. | Jan. 11, 1949 |
| 2,495,042 | Wilder et al. | Jan. 17, 1950 |
| 2,539,442 | Larson | Jan. 30, 1951 |
| 2,588,019 | Law | Mar. 4, 1952 |
| 2,617,058 | De Boer et al. | Nov. 4, 1952 |